United States Patent
Falkinder et al.

(10) Patent No.: US 11,593,021 B2
(45) Date of Patent: Feb. 28, 2023

(54) WRITING A CONTAINER INDEX TO PERSISTENT STORAGE

(71) Applicants: David Malcolm Falkinder, Bristol (GB); Richard Phillip Mayo, Bristol (GB)

(72) Inventors: David Malcolm Falkinder, Bristol (GB); Richard Phillip Mayo, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/091,048

(22) Filed: Nov. 6, 2020

(65) Prior Publication Data

US 2022/0147264 A1   May 12, 2022

(51) Int. Cl.
  *G06F 3/06*   (2006.01)
  *H04L 9/06*   (2006.01)

(52) U.S. Cl.
  CPC .......... *G06F 3/0655* (2013.01); *G06F 3/0608* (2013.01); *G06F 3/0676* (2013.01); *G06F 3/0679* (2013.01); *H04L 9/0643* (2013.01)

(58) Field of Classification Search
  CPC .... G06F 3/0655; G06F 3/0679; G06F 3/0608; G06F 3/0643; G06F 3/0676; G06F 3/0641; G06F 3/0671; H04L 9/0643
  USPC ........................................................ 711/154
  See application file for complete search history.

(56) References Cited

U.S. PATENT DOCUMENTS

| | | | |
|---|---|---|---|
| 9,306,988 B2 | 4/2016 | Barton et al. | |
| 9,372,941 B2 | 6/2016 | Jones | |
| 10,255,206 B2 | 4/2019 | Zuckerman et al. | |
| 2012/0079583 A1 | 3/2012 | Christiansen et al. | |
| 2013/0117507 A1* | 5/2013 | Chiang | G06F 12/0866 711/115 |
| 2017/0353516 A1* | 12/2017 | Gordon | H04L 67/02 |
| 2019/0102418 A1 | 4/2019 | Vasudevan et al. | |
| 2021/0064520 A1* | 3/2021 | Kanno | G06F 12/1009 |

OTHER PUBLICATIONS

Burnett et al., "Controlling File System Write Ordering," 4th USENIX Conference on File and Storage Technologies, Dec. 13-16, 2005.
Burnett et al., "Controlling File System Write Ordering," Presentation Slides, 4th USENIX Conference on File and Storage Technologies, Dec. 15, 2005.
Chae, Y. et al.; "Silo, Rainbow, and Caching Token: Schemes for Scalable, Fault Tolerant Stream Caching"; Sep. 2002; 17 pages.
Wikipedia, "Futures and promises," Feb. 18, 2020.

* cited by examiner

*Primary Examiner* — Hashem Farrokh
(74) *Attorney, Agent, or Firm* — Trop, Pruner & Hu, P.C.

(57) ABSTRACT

Example implementations relate to metadata operations in a storage system. An example method includes receiving, from a first stream process, a first write request for a first container index in memory. The method further includes, in response to a receipt of the first write request, sending a first token to the first stream process without writing the first container index to a persistent storage. The method further includes receiving, from a second stream process, a first completion request for the first container index. The method further includes, in response to a receipt of the first completion request, writing the first container index from the memory to the persistent storage.

20 Claims, 9 Drawing Sheets

| Contract Data Structure 600 |||||
|---|---|---|---|---|
| Token | Client | Object | Version | Status |
| XyZa3w | Stream A | C1 | V1 | Executed |
| K8oTxH | Stream B | C1 | V1 | Executed |
| ⋮ | ⋮ | ⋮ | ⋮ | ⋮ |
| Aad67R | Stream N | Journal2 | V3 | Pending |

WRITING A CONTAINER INDEX TO PERSISTENT STORAGE

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

Figure 1:
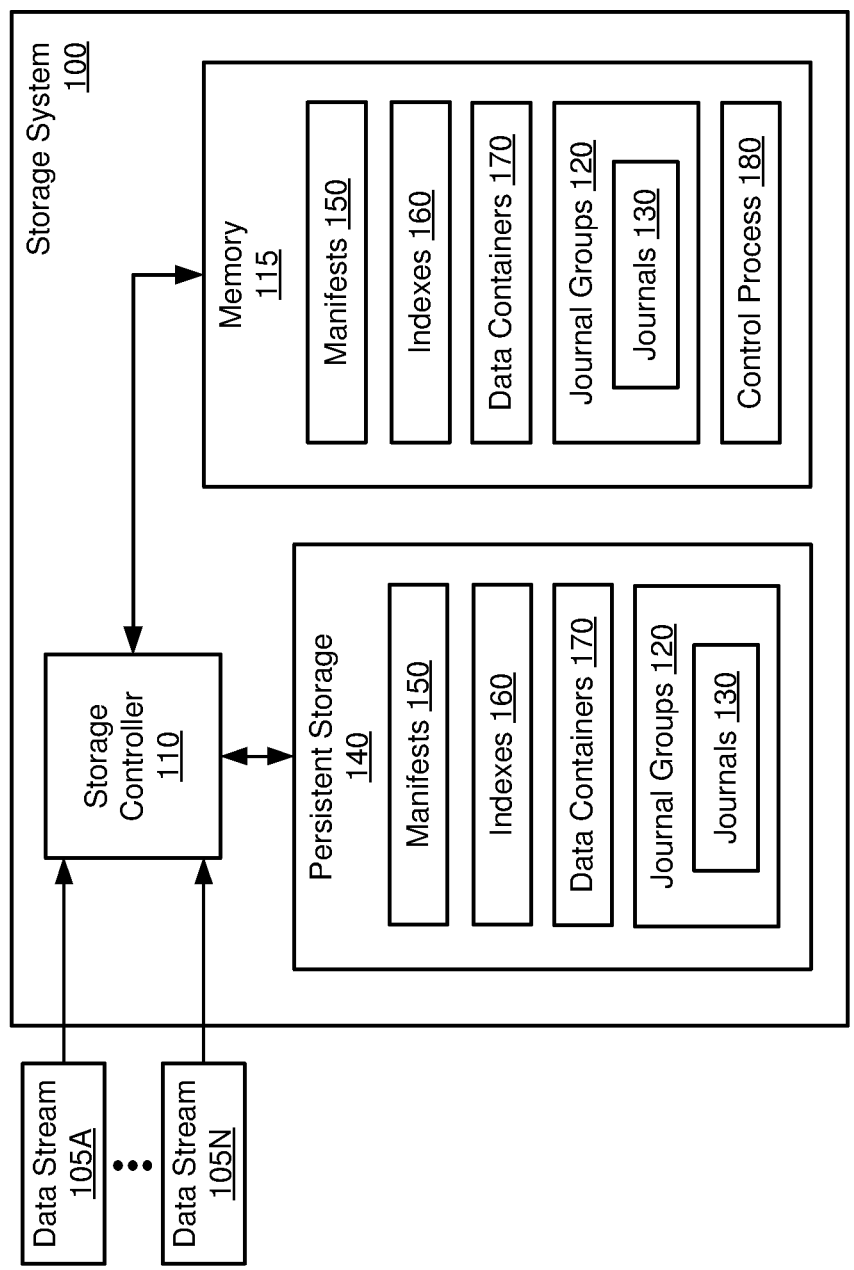
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may deduplicate data to reduce the amount of space required to store the data. The storage system may perform a deduplication process including breaking a stream of data into discrete data units or "chunks." Further, the storage system may determine identifiers or "fingerprints" of incoming data units, and may determine which incoming data units are duplicates of previously stored data units. In the case of data units that are duplicates, the storage system may store references to the previous data units instead of storing the duplicate incoming data units.

As used herein, the term "fingerprint" refers to a value derived by applying a function on the content of the data unit (where the "content" can include the entirety or a subset of the content of the data unit). An example of the function that can be applied includes a hash function that produces a hash value based on the incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use metadata for processing one or more inbound data streams (e.g., multiple concurrent inbound data streams). For example, such metadata may include data recipes (also referred to herein as "manifests") that specify the order in which particular data units are received (e.g., in a data stream). Subsequently, in response to a read request, the deduplication system may use a manifest to determine the received order of data units, and may thereby recreate the original data stream. The manifest may include a sequence of records, with each record representing a particular set of data unit(s).

The records of the manifest may include one or more fields (also referred to herein as "pointer information") that identify indexes that include storage information for the data units. For example, the storage information may include one or more index fields that specify location information (e.g., containers, offsets, etc.) for the stored data units, compression and/or encryption characteristics of the stored data units, and so forth. In some examples, the manifests and indexes may each be read in addressable portions of fixed sizes (e.g., 4 KB portions).

In some examples, while processing inbound data streams, the deduplication system may generate and update data objects in memory. For example, each data stream may be associated with data containers, manifests (specifying the received order of the data units), and container indexes (specifying storage information such as identifiers of data containers, offsets, and so forth). However, such data objects that are only present in memory may be lost during a power loss or system error. Accordingly, at various times during operation, the deduplication system may write such data objects from memory to persistent storage (also referred to herein as "persisting" each object).

In some examples, a conventional process for persisting data objects of an inbound stream may include, for each manifest of the inbound stream, persisting data containers associated with the manifest, then persisting container indexes associated with the manifest, and finally persisting the manifest itself. Further, to ensure transactional integrity of the data objects, persisting a first manifest and its associated data objects must be successfully completed before continuing to persisting another manifest and its associated data objects. However, in examples that include multiple inbound streams, the same data object (e.g., a particular container index) may be persisted multiple times (i.e., once for each inbound stream). Accordingly, such conventional persistence operations may involve duplicated and inefficient writes to persistent storage, and may thus result in relatively slow and/or inefficient deduplication operations.

In accordance with some implementations of the present disclosure, a storage system may include a control process to manage persistence operations. The control process may receive a request for a persistence operation from a stream process, and in response may provide a token to the stream process instead of performing the requested persistence operation. In some implementations, the provided token may represent or be associated with a contract or commitment to perform the requested write at a later point in time (also referred to herein as a "persistence contract." Further, the stream process can subsequently use the token to complete the persistence operation.

In some implementations, multiple tokens can be issued to multiple requestors, where these tokens represent multiple persistence contracts for a single data object (e.g., a particular container index). When the data object is persisted at a later point in time, the multiple persistence contracts may be simultaneously fulfilled by a single write operation. In this manner, the storage system can provide persistence of a data object while reducing the number of duplicated writes of the data object. Accordingly, some implementations may improve the performance of the storage system, and may reduce the amount of computing resources that are consumed to provide data persistence.

1. Example Storage System

FIG. 1 shows an example of a storage system 100 that includes a storage controller 110, memory 115, and persistent storage 140, in accordance with some implementations. As shown, the persistent storage 140 may include any number of manifests 150, container indexes 160, data containers 170, and journal groups 120. Further, the memory 115 may also include manifests 150, container indexes 160, data containers 170, journal groups 120, and a control process 180. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM).

In some implementations, the storage system 100 may perform concurrent deduplication of multiple inbound data streams 105A-105N (also referred to herein as "data streams 105"). For example, the storage controller 110 may divide each data stream 105 into data units, and may store at least one copy of each data unit in a data container 170 (e.g., by appending the data units to the end of the container 170). In some examples, each data container 170 may be divided into portions (also referred to herein as "entities") (not shown in FIG. 1). Each entity may include one or more stored data units.

In one or more implementations, the storage controller 110 may generate a fingerprint for each data unit. For example, the fingerprint may include a full or partial hash value based on the data unit. To determine whether an incoming data unit is a duplicate of a stored data unit, the storage controller 110 may compare the fingerprint generated for the incoming data unit to the fingerprints of the stored data units. If this comparison results in a match, then the storage controller 110 may determine that a duplicate of the incoming data unit is already stored by the storage system 100.

In some implementations, the storage controller 110 may generate a manifest 150 to record the order in which the data units were received in each data stream 105. Further, the manifest 150 may include a pointer or other information indicating the container index 160 that is associated with each data unit. In some implementations, the associated container index 160 may indicate the location in which the data unit is stored. For example, the associated container index 160 may include information specifying that the data unit is stored at a particular offset in an entity, and that the entity is stored at a particular offset in a data container 170.

In some implementations, the storage controller 110 may receive a read request to access the stored data, and in response may access the manifest 150 to determine the sequence of data units that made up the original data. The storage controller 110 may then use pointer data included in the manifest 150 to identify the container indexes 160 associated with the data units. Further, the storage controller 110 may use information included in the identified container indexes 160 to determine the locations that store the data units (e.g., data container 170, entity, offsets, etc.), and may then read the data units from the determined locations.

In some implementations, each journal group 120 may include multiple journals 130. Each journal 130 may be associated with a corresponding index 160. In some implementations, a journal 130 in memory 115 may record changes associated with the metadata stored in the associated index 160. For example, when a copy of the index 160 present in memory 115 is modified to reflect a change to the metadata, that change may also be recorded as an entry in the associated journal 130. In some implementations, each journal group 120 may be associated with a single file or object stored in the deduplication system. For example, the multiple journals 130 included in a particular journal group 120 may correspond to indexes storing metadata associated with a single file.

In some implementations, the storage system 100 may store an index 160 in the memory 115 while accessing data unit(s) associated with that index 160. For example, the index 160 may be stored in memory 115 while data units associated with index 160 are added to a data container 170, are deleted from the data container 170, and so forth. Further, the memory 115 may also store a journal group 120 that includes a journal 130 corresponding to the index 160. In some implementations, the journal 130 may record a set of changes associated with the metadata stored in the index 160. For example, when modifying the index 160 in memory 115 to reflect a change to the metadata, that change may also be recorded in the journal 130.

In some implementations, in response to a command or an event, the index 160 may be modified to include the changes recorded in the journal 130. For example, upon loading an index 160 and associated journal 130 into memory 115 (e.g., in response to a read request), the version number of the index 160 and the journal 130 may be compared. If the version number of the journal 130 is higher (i.e., newer) than the version number of the index 160, the changes recorded in the index 160 may be accessed in chronological order (e.g., in order of occurrence), and each change may be sequentially performed in the index 160. Otherwise, if the version number of the journal 130 is not higher than the version number of the index 160, the journal 130 may be cleared of all recorded changes, and the journal 130 may be made available for recording additional changes.

In some implementations, when events occur that would result in changes to the metadata stored in an index 160, those changes may be recorded in a journal 130 associated with the index 160. In some examples, when a requirement exists to write the index 160 to persistent storage 140, a determination may be made as to whether a filled level of the associated journal 130 exceeds a predefined threshold. If the filled level does not exceed the threshold, the journal 130 is written to the persistent storage 140 instead of the index 160. Further, because the journal 130 only records recent changes to the index 160, writing the journal 130 to the persistent storage 140 may consume relatively less processing time and bandwidth than would be required if the entire index 160 was being written to the persistent storage 140.

In one or more implementations, the control process 180 may receive a persistence request for a container index 160 in the memory 115, and in response may provide a token to a requesting process. The token may represent a contract to perform the requested persistence operation at a later point in time. The use of tokens to represent persistence contracts is described further below with reference to FIGS. 4-10. The control process 180 may be executed by the storage controller 110

2. Example Data Structures

Figure 2:
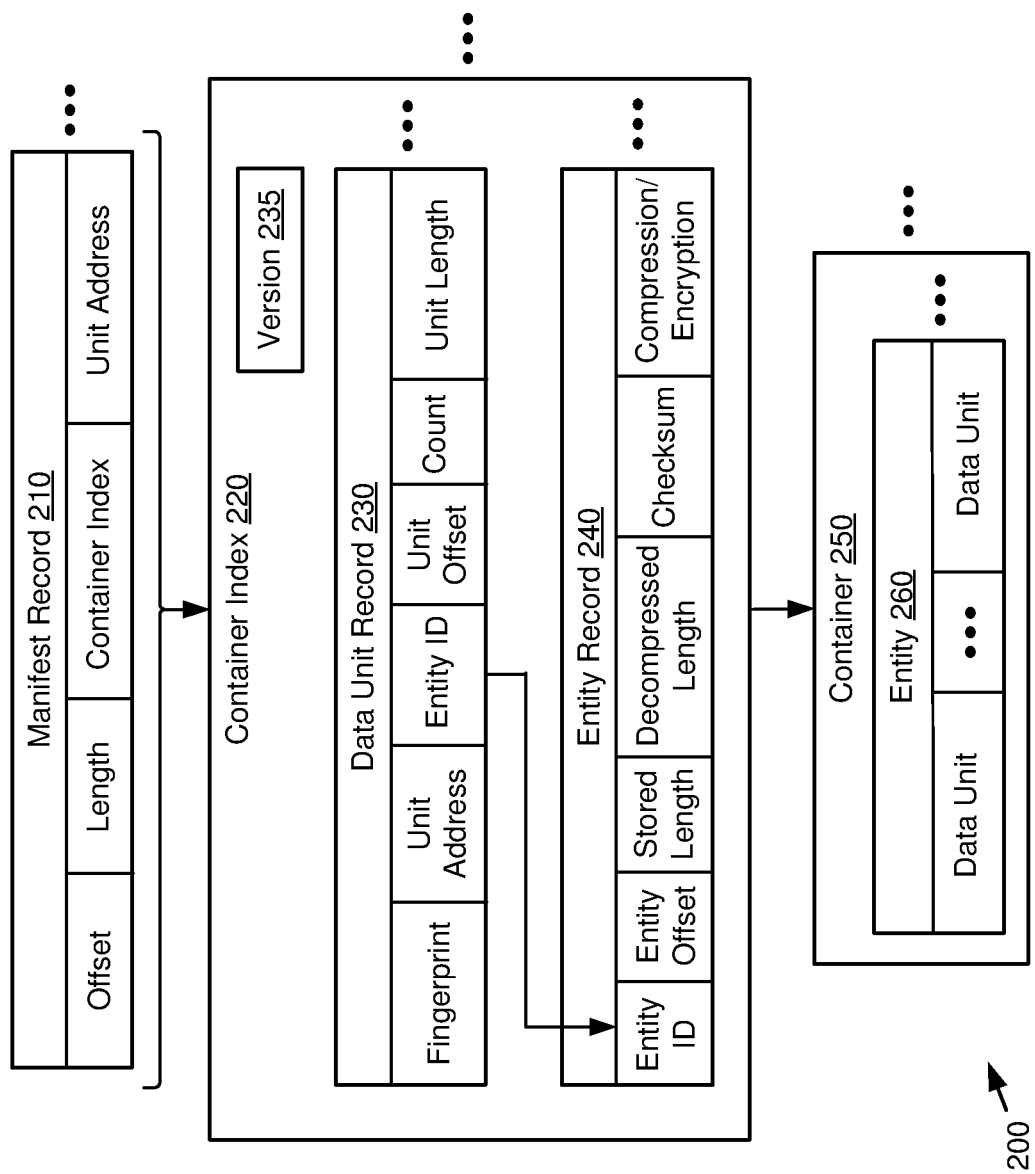
FIG. 2 is an illustration of example data structures, in accordance with some implementations.

Referring now to FIG. 2, shown is an illustration of example data structures 200 used in deduplication, in accordance with some implementations. As shown, the data structures 200 may include a manifest record 210, a container index 220, a container 250, and an entity 260. In some examples, the manifest record 210, the container index 220, the container 250, and the entity 230 may correspond generally to example implementations of a manifest record 155, an index 160, a data container 170, and an entity 175 (shown in FIG. 1), respectively. In some examples, the data structures 200 may be generated and/or managed by the storage controller 110 (shown in FIG. 1).

As shown in FIG. 2, in some examples, the manifest record 210 may include various fields, such as offset, length, container index, and unit address. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a count value, and a unit length. Further, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In some implementations, each container index 220 may include a version number 235 that indicates a generation or relative age of the metadata in the container index. For example, the version number 235 may be compared to a version number of an associated journal (not shown in FIG. 2). If the version number 235 is greater than the version number of the associated journal, it may be determined that the container index 220 includes newer metadata than the associated journal.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identity the container 250 and entity 260, and the data unit may then be read from the identified container 250 and entity 260.

3. Example Data Structures

Figure 3:
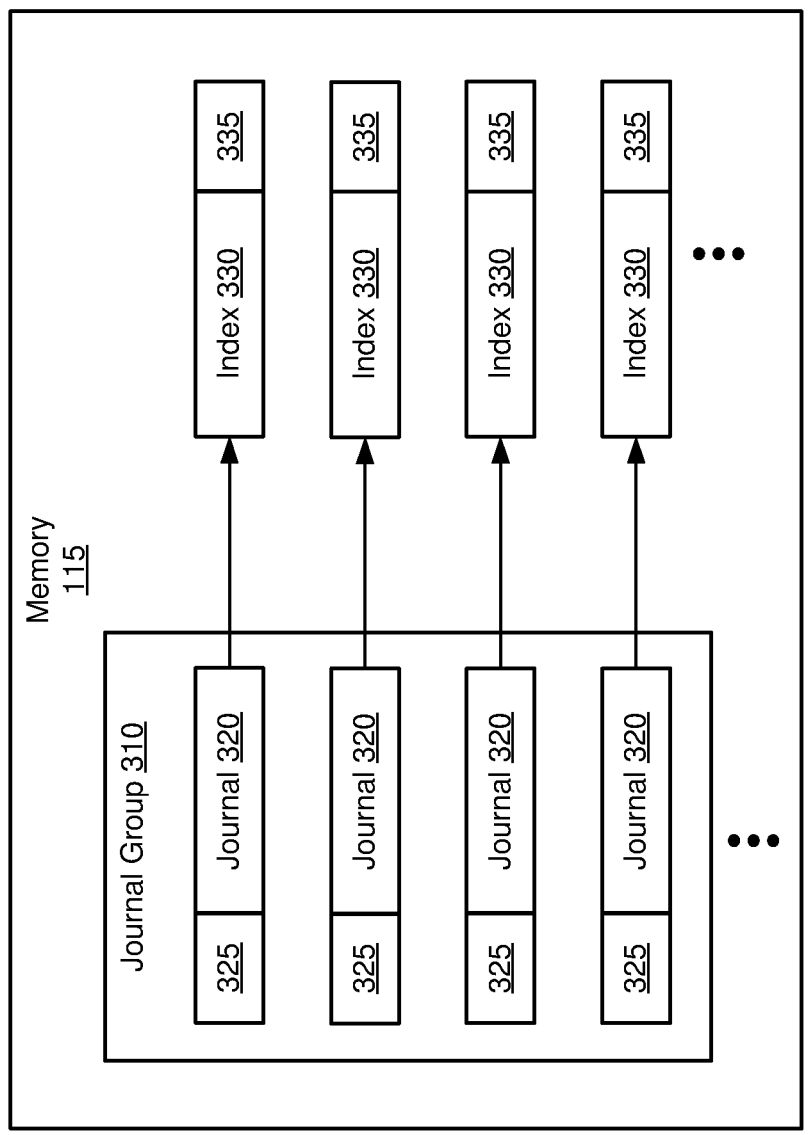
FIG. 3 is an illustration of example data structures, in accordance with some implementations.

Referring now to FIG. 3, shown is an illustration of the memory 115 including a journal group 310 and multiple indexes 330. As shown, the journal group 310 includes multiple journals 320. In some examples, the journal group 310, journals 320, and indexes 330 may correspond generally to example implementations of the journal group 120, journals 130, and indexes 160 (shown in FIG. 1), respectively.

In some implementations, each journal 320 may be associated with a corresponding index 330, and may record changes to the metadata stored in the corresponding index 330. Further, for each journal group 120, all of the corresponding indexes 330 may be associated with a single stored object (e.g., a document, a database table, a data file, and so forth). For example, all of the corresponding indexes 330 may include metadata for data units included in a single file stored in a deduplication system (e.g., storage system 100 shown in FIG. 1).

In some implementations, each journal 320 may include or be associated with a version number 325. Further, each index 330 may include or be associated with a version number 335. In some implementations, the version number 325 may be compared to the version number 335 to determine whether the journal 320 or the associated index 330 reflects the latest version of metadata. For example, if the version number 325 is greater than the version number 335, it may be determined that the change data included in the journal 320 reflects a state of metadata that is more recent than the metadata stored in the index 330. If so, the index 330 may be updated to include the changes recorded in the journal 320. However, if the version number 325 is smaller than the version number 335, it may be determined that the change data included in the journal 320 reflects a state of metadata that is older than the metadata stored in the index 330. In this situation, the journal 320 may be cleared without updating the index 330. In some implementations, the comparison of the version number 325 to the version number 335 may be performed in response to loading the journal 320 or the associated index 330 from persistent storage into memory (e.g., from persistent storage 140 into memory 115, as shown in FIG. 1). In one or more implementations, the number of journals 320 included in a journal group 310 may be specified in a stored parameter (e.g., a user setting, a configuration variable, and so forth).

4. Example System

Figure 4:
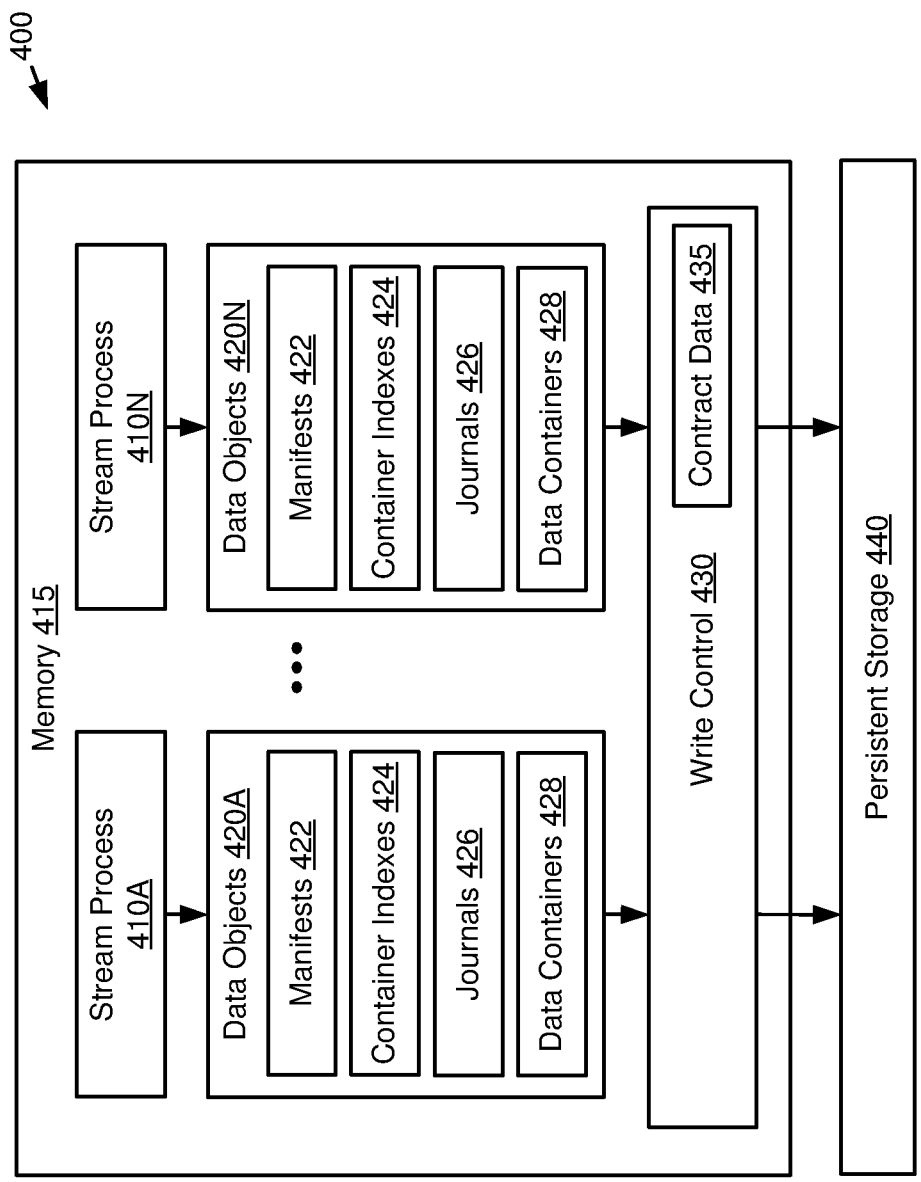
FIG. 4 is an illustration of an example system, in accordance with some implementations.

Referring now to FIG. 4, shown is an example system 400, in accordance with some implementations. As shown, the system 400 may include memory 415 and persistent storage 440. In some examples, the memory 415 and the persistent storage 440 may correspond generally to example implementations of the memory 115 and persistent storage 140 (shown in FIG. 1), respectively.

As shown, the memory 415 may include multiple stream processes 410A-410N (also referred to herein as "stream processes 410"), multiple sets of data objects 420A-420N (also referred to herein as "data objects 420"), and a write control 430. Each stream process 410 may be an execution process (e.g., a thread, a module, an application, and so forth) associated with a single data stream. For example, each stream process 410 may be executed by a processor (not shown in FIG. 4), and may manage deduplication of an associated data stream based on external data (e.g., data received over a network from a remote source) or local data (e.g., a file or other data stored in the persistent storage 440). As shown in FIG. 4, each stream process 410 may generate and/or update a corresponding set of data objects 420. Each set of data objects 420 may include manifests 422, container indexes 424, journals 426, and data containers 428. In some implementations, each journal 426 may be associated with a particular container index 424.

In some implementations, the write control 430 may be an execution process that manages writes of the data objects 420 from the memory 415 to the persistent storage 440 (also referred to herein as "persistence operations"). For example, the write control 430 may receive a persistence request from a stream process 410, and in response may provide a token to the stream process 410. The token may represent a contract to perform the requested persistence operation at a later point in time. In some examples, the write control 430 may correspond generally to an example implementation of the control process 180 (shown in FIG. 1).

In some implementations, multiple stream processes 410 may utilize the same data object 420 (e.g., a particular container index 424), and may separately send persistence requests for the same data object 420 to the write control 430. Instead of performing the requested persistence operations, the write control 430 may provide the requesting stream processes 410 with various tokens that represent persistence contracts for the same data object 420. At a later point in time, the write control 430 may persist the data object 420 by performing a single write operation from the memory 415 to the persistent storage 440. Further, the multiple persistence contracts (represented by the multiple tokens) may be fulfilled by this single write operation.

In some implementations, each token may be a unique identifier that represents a persistence contract, but which is "opaque" to the stream process 410 (i.e., cannot be read or parsed by the stream process 410 to determine specific information about the associated contract). For example, the write control 430 may generate each token as a random string of alphanumeric characters. Further, the write control 430 may include a contract data structure 435 to track information about the tokens provided to the stream processes 410 and the associated persistence contracts. For example, the contract data structure 435 may track each token, the stream process 410 that received the token, the data object to be persisted, the current status of the persistence operation, and so forth. An example operation using the tokens and the contract data structure 435 is described below with reference to FIG. 5.

In some implementations, the write control 430 may persist each data object 420 by first issuing a token that represents a persistence contract, and subsequently completing or "fulfilling" the persistence contract represented by the token (also referred to herein a "completing the token"). In some examples, the write control 430 may issue the token in response to a persistence request from a stream process 410.

In some implementations, the write control 430 may complete the token in response to a token completion request from a stream process 410. For example, the token completion request may be a flush command generated by the stream process 410 in response to reaching the endpoint or a checkpoint of an inbound data stream. In some examples, the completion request may include the token (e.g., as a parameter, filed, etc.). Further, in some implementations, the write control 430 may complete the token in response to an event or condition that arises in the system 400 (also referred to herein as "system events"). For example, a container index 424 in memory may be selected for eviction according to a least recently used (LRU) policy (e.g., if the memory space allocated for the container indexes 424 is full), and in response the write control 430 may cause the selected container index to be written to persistent storage. In this manner, a persistence contract for the selected container index 424 may be fulfilled by the eviction system event.

In one or more implementations, the persistence contract represented by a token may be associated with a combination of a particular container index 424 and its version number. For example, if a first container index C1 has a first version number V1 at the point in time at which a first token is generated, then the first token may represent a contract to persist a copy of the first container index C1 with the first version number V1. In another example, if the first container index C1 has a second version number V2 at a later point in time at which a second token is generated, then the second token may represent a contract to persist a copy of the first container index C1 with the second version number V2. Further, in some implementations, the version number of the container index 424 may be incremented (e.g., to V2) in response to a persistence operation that writes the container index 424 at a first version number (e.g., V1).

In some implementations, a token that represents a contract to persist a container index 424 may be modified so that it instead represents a contract to persist a journal 426 associated with the container index 424. For example, the write control 430 (or another control module) may determine that the memory space allocated for the container indexes 424 has exceeded a threshold level, and may thus cause a first journal 426 to be used in place of an associated container index 424 (i.e., to record metadata changes for an incoming stream). Further, the write control 430 may modify an existing contract to persist the container index 424 to instead persist the first journal 426. Furthermore, the write control 430 can modify contracts to persist journals 426 to instead persist the associated container indexes 424. In some implementations, such contract modifications may be made and tracked by the write control 430, but may hidden from the stream processes 410 that receive the tokens.

5. Example Operation

Figure 5:
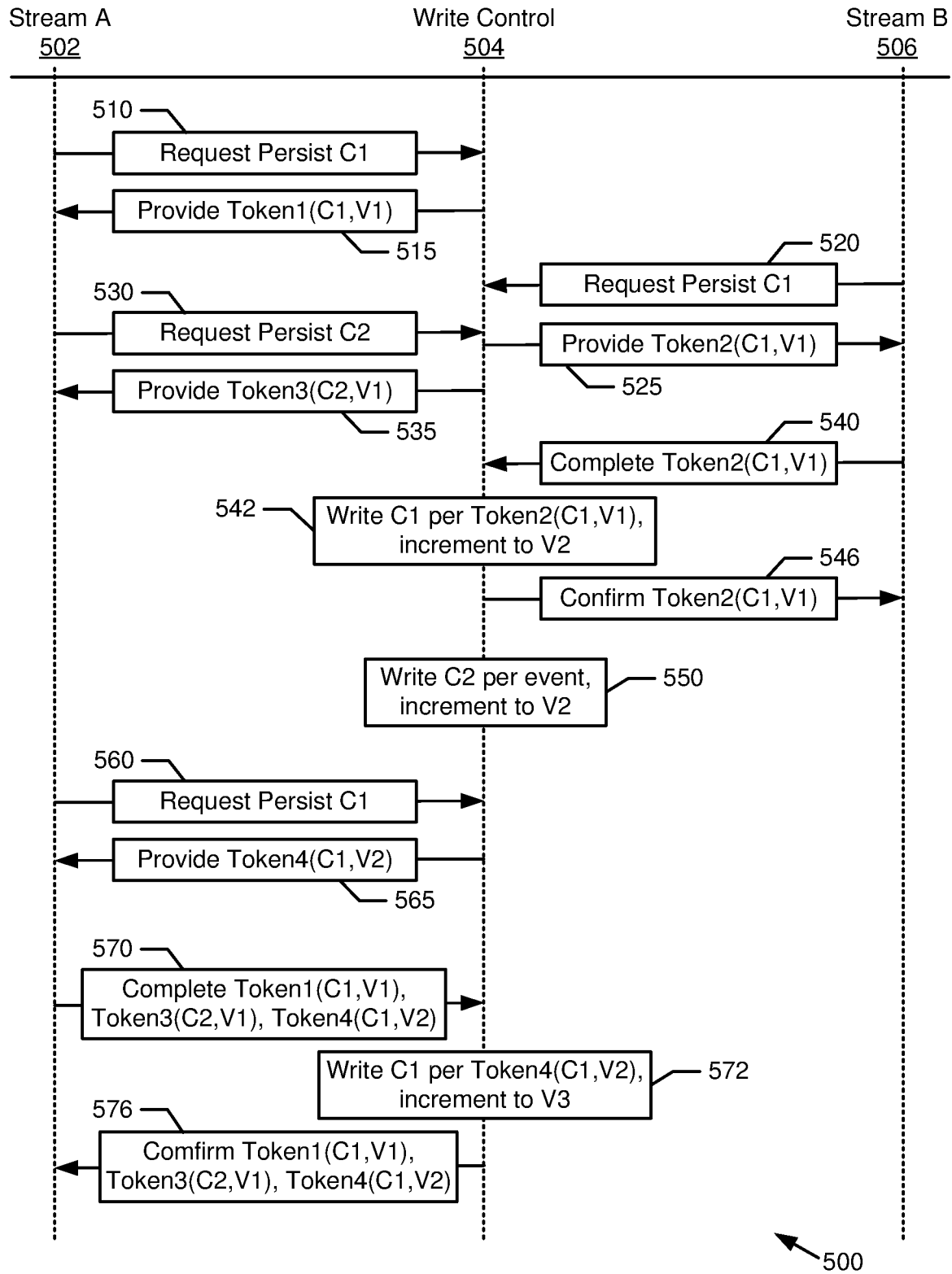
FIG. 5 is an illustration of an example operation, in accordance with some implementations.

Referring now to FIG. 5, shown is an example operation 500, in accordance with some implementations. As shown, the example operation 500 involves data flow and/or actions for three processes, namely StreamA 502, write control 504, and StreamB 506. The StreamA 502 and the StreamB 506 may be streaming processes executed by a processor (e.g., storage controller 110 shown in FIG. 1). Further, the write control 504 is a write control process executed by the processor. Assume that, in the illustration shown in FIG. 5, different points in time are shown at different vertical locations, with the relatively higher vertical locations representing earlier points in time, and the relatively higher lower locations representing later points in time.

At the earliest point in time shown in FIG. 5, StreamA 502 may send a request 510 to persist a first container index C1. Assume that, at this point in time, the first container index C1 has a version number V1 (e.g., corresponding to the version number 235 shown in FIG. 2). Accordingly, in response to the request 510, the write control 504 may provide 515 a Token1(C1,V1) to StreamA 502. As used herein, the notation "Token1(C1,V1)" refers to a first token representing a persistence contract for a container index C1 with a version number V1. Assume that, in the example operation 500, the first container index C1 is not persisted in response to the request 510.

At a later point in time, StreamB 506 may send a request 520 to persist the first container index C1. Accordingly, in response to the request 520, the write control 504 may provide 525 a Token2(C1,V1) to StreamB 506. Further, StreamA 502 may send a request 530 to persist a second container index C2. Assume that, at this point in time, the second container index C2 has a version number V1. Accordingly, in response to the request 530, the write control 504 may provide 535 a Token3(C2,V1) to StreamA 502. Assume that, in the example operation 500, the first container index C1 is not persisted in response to the request 520, and the second container index C2 is not persisted in response to the request 530.

At a later point in time, StreamB 506 may send a request 540 to complete the Token2(C1,V1). As used herein, the phrase "complete the token" refers to fulfilling the persistence contract represented by the token. In response to the request 540, the write control 504 may write 542 the first container index C1 per the Token2(C1,V1). Stated differently, the write control 504 may complete the Token2(C1,V1) by writing version V1 of the first container index C1 to persistent storage. Further, in response to writing the first container index C1 to persistent storage, the write control 504 may increment the version number of the first container index C1 from V1 to V2. Furthermore, after writing the first container index C1 to persistent storage, the write control 504 may send a confirmation 546 to StreamB 506 that the Token2(C1,V1) has been completed.

At a later point in time, the write control 504 may write 550 the second container index C2 per a system event. For example, if the memory space allocated for container indexes is full, a least recently used (LRU) process may designate the second container index C2 to be evicted from memory. Accordingly, the write control 504 may write the second container index C2 to persistent storage to avoid the loss of index information when the second container index C2 is evicted from memory. Further, in response to writing the second container index C2 to persistent storage, the write control 504 may increment the version number of the second container index C2 from V1 to V2.

At a later point in time, StreamA 502 may send a request 560 to persist the first container index C1. Recall that the version number of the first container index C1 was incremented to V2 (i.e., at box 542). Accordingly, in response to the request 560, the write control 504 may provide 565 a Token4(C1,V2) to StreamA 502.

At a later point in time, StreamA 502 may send a request 570 to complete Token1(C1,V1), Token3(C2,V1), and Token4(C1,V2). In response to the request 570, the write control 504 may read stored contract data (e.g., contract data 435 shown in FIG. 4), and may thereby determine that Token1(C1,V1) and Token3(C2,V1) were previously completed. Specifically, Token1(C1,V1) was previously completed when the first container index C1 was written per Token2(C1,V1) (i.e., at box 542). Further, Token3(C2,V1) was previously completed when the second container index C2 was written per the system event (i.e., at box 550). Accordingly, the write control 504 may write 572 the first container index C1 per Token4(C1,V2). Stated differently, the write control 504 may complete the Token4(C1,V2) by writing version V2 of the first container index C1 to persistent storage. Further, in response to writing the first container index C1 to persistent storage, the write control 504 may increment the version number of the first container index C1 from V2 to V3. Furthermore, the write control 504 may send a confirmation 576 to StreamA 502 that Token1(C1,V1), Token3(C2,V1), and Token4(C1,V2) have been completed.

6. Example Contract Data Structure

Figures 6, 7:
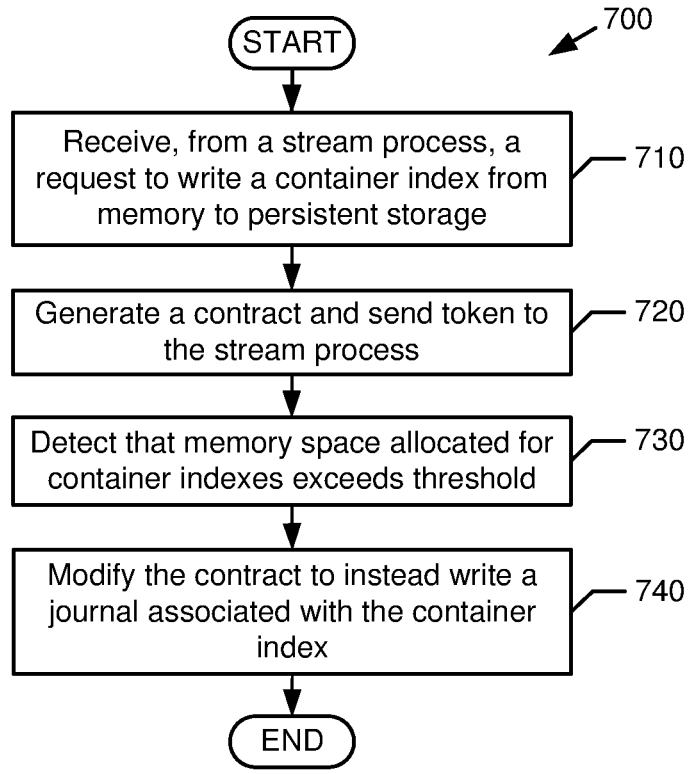
FIG. 6 is an illustration of an example data structure, in accordance with some implementations.
FIG. 7 is an illustration of an example process, in accordance with some implementations.

Referring now to FIG. 6, shown is an example contract data structure 600 in accordance with some implementations. In some examples, the contract data structure 600 may correspond generally to example implementation of the contract data 435 associated with the write control 430 (shown in FIG. 4). As shown in FIG. 6, the contract data structure 600 may include any number of entries that correspond to different tokens. In some implementations, a write control process may use the contract data structure 600 to track and modify persistence contracts represented by issued tokens.

In some implementations, each entry of the contract data structure 600 may include any number of data fields related to a specific token. For example, as shown in FIG. 6, each entry may include a token value, a client identifier, an object identifier, a version number, and/or a status field. In some examples, the token value may be a unique alphanumeric string. The client identifier may identify a process (e.g., stream process StreamA 502 shown in FIG. 5) and that receives the token (e.g., in response to a persistence request).

In some implementations, the object identifier and version number may identify the data object and its version (e.g., a container index 424 or an associated journal 426, as shown in FIG. 4) that will be persisted by the contract represented by the token. The status field may indicate a status of the contract (e.g., not fulfilled, already fulfilled, completed, and so forth).

In one or more implementations, the object identifier of an entry may be updated in the event that the contract represented by the entry is modified to persist a different data object. For example, if an entry is initially associated with a contract to persist a container index, and the contract is modified to instead persist a journal, the object identifier of that entry may be updated to identify the journal instead of the container index. In some examples, a write control process (or another control process) may determine that the memory space allocated for the container indexes has exceeded a threshold level, and may thus cause a first journal to be used in place of an associated container index (i.e., to record metadata changes for an incoming stream). Further, the write control process may modify an existing contract to persist the container index to instead persist the first journal.

7. Example Process for Capping Tracking Data in a Container Index

Referring now to FIG. 7, shown is an example process 700 for modifying a contract, in accordance with some implementations. In some examples, the process 700 may be performed to modify a contract to persist one type of data object to instead persist a different type of object. The process 700 may be performed using the storage controller 110 (shown in FIG. 1). The process 700 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 700 may be described below with reference to FIGS. 1-6, which show examples in accordance with some implementations. However, other implementations are also possible.

Block 710 may include receiving, from a stream process, a request to write a container index from memory to persistent storage. Block 720 may include generating a contract and send token to the stream process. For example, referring to FIG. 4, the write control 430 may receive, from stream process 410A, a request to persist a container index 424. In response, the write control 430 may send a token to the stream process 410A, where the token represents a contract to persist the container index 424.

Block 730 may include detecting that a memory space allocated for container indexes exceeds a threshold. Block 740 may include modifying the contract to instead write a journal associated with the container index. For example, referring to FIG. 4, the write control 430 (or another control module) may determine that the memory space allocated for the container index 424 has exceeded a threshold level, and in response may modify the contract to instead persist a journal 426 associated with the container index 424. After block 740, the process 700 may be terminated.

8. Example Process for Persisting a Container Index

Figure 8:
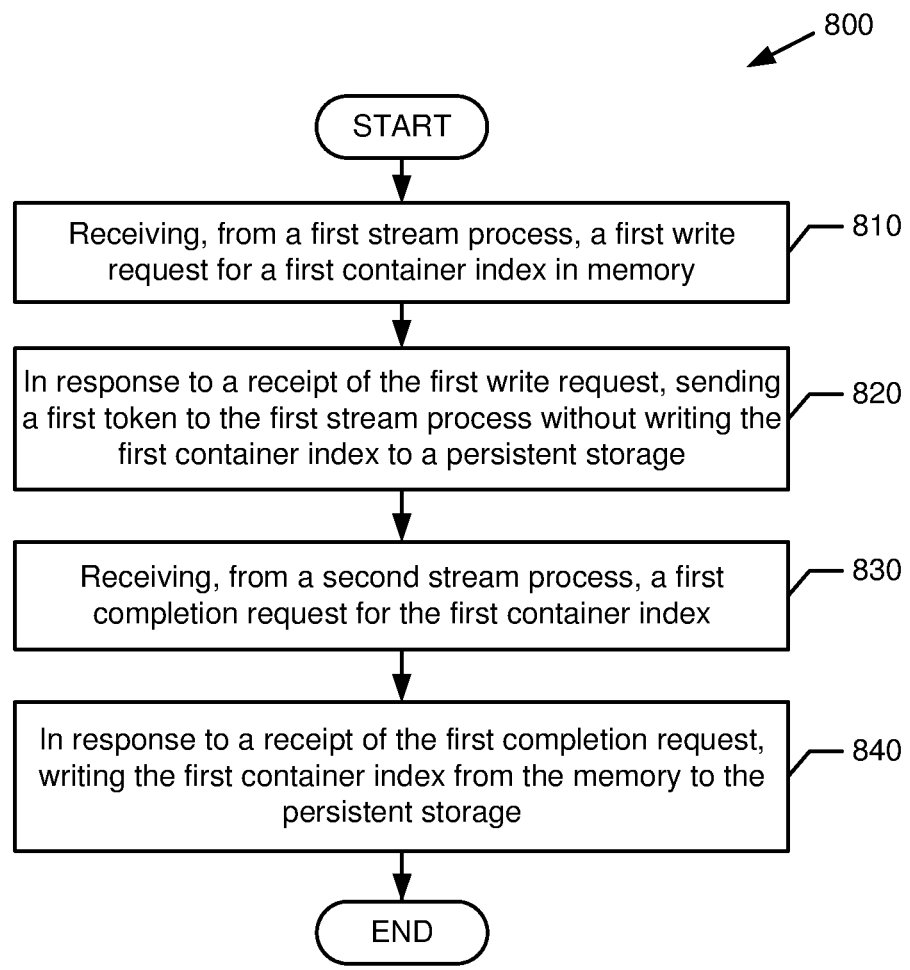
FIG. 8 is an illustration of an example process, in accordance with some implementations.

Referring now to FIG. 8, shown is an example process 800 for persisting a container index, in accordance with some implementations. In some examples, the process 800 may be performed using the storage controller 110 (shown in FIG. 1). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 800 may be described below with reference to FIGS. 1-6, which show examples in accordance with some implementations. However, other implementations are also possible.

Block 810 may include receiving, from a first stream process, a first write request for a first container index in memory. Block 820 may include, in response to a receipt of the first write request, sending a first token to the first stream process without writing the first container index to a persistent storage. For example, referring to FIG. 5, the write control 504 may receive a request 520 from stream process StreamB 506 to persist a first container index C1. In response, the write control 504 may provide 525 a Token2 (C1,V1) to StreamB 506.

Block 830 may include receiving, from a second stream process, a first completion request for the first container index. Block 840 may include, in response to a receipt of the first completion request, writing the first container index from the memory to the persistent storage. For example, referring to FIG. 5, the write control 504 may receive a request 540 to complete Token2(C1,V1) from StreamB 506. In response, the write control 504 may write 542 version V1 of the first container index C1 to persistent storage. After block 840, the process 800 may be terminated. Process 800 may include, prior to receiving the first completion request from the second stream process, receiving, from the second stream process, a second write request for the first container index in memory, and, in response to a receipt of the second write request, sending a second token to the second stream process without writing the first container index to the persistent storage.

9. Example Machine-Readable Medium

Figure 9:
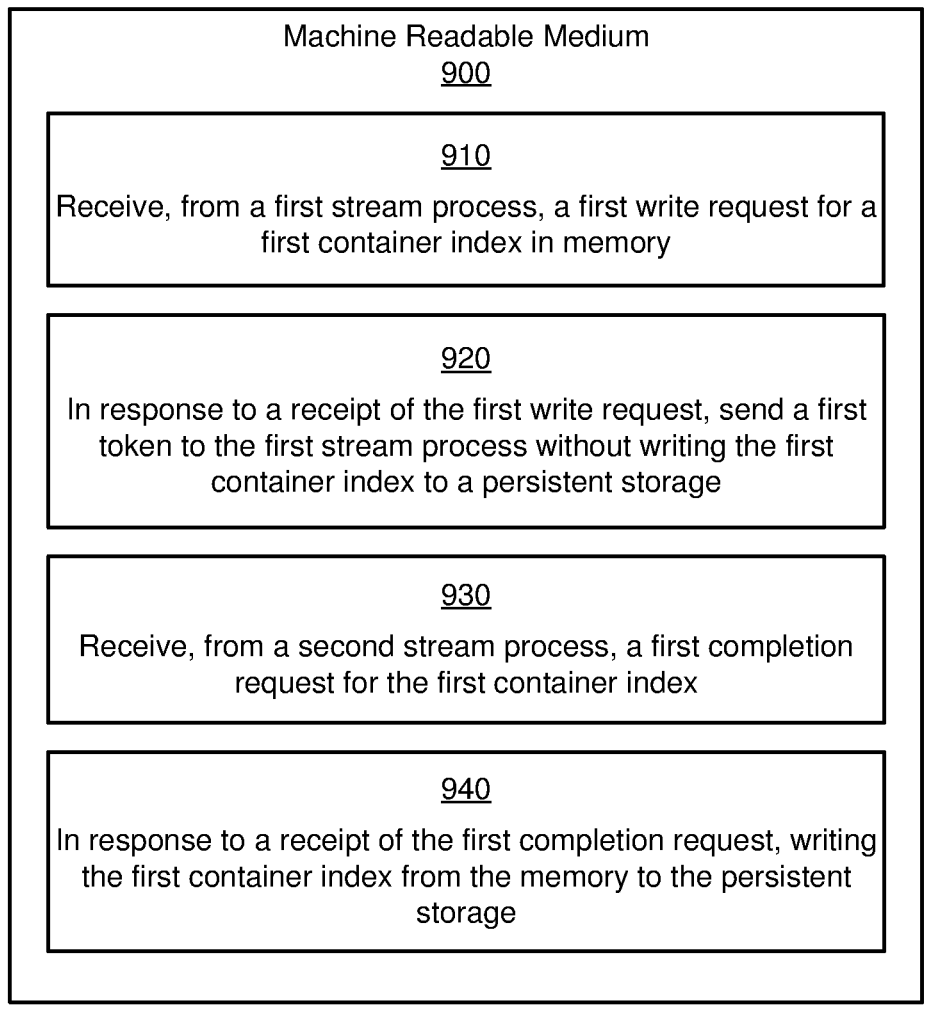
FIG. 9 is a diagram of an example machine-readable medium storing instructions in accordance with some implementations.

FIG. 9 shows a machine-readable medium 900 storing instructions 910-940, in accordance with some implementations. The instructions 910-940 can be executed by a single processor, multiple processors, a single processing engine, multiple processing engines, and so forth. The machine-readable medium 900 may be a non-transitory storage medium, such as an optical, semiconductor, or magnetic storage medium.

Instruction 910 may be executed to receive, from a first stream process, a first write request for a first container index in memory. Instruction 920 may be executed to, in response to a receipt of the first write request, send a first token to the first stream process without writing the first container index to a persistent storage. Instruction 930 may be executed to receive, from a second stream process, a first completion request for the first container index. Instruction 940 may be executed to, in response to a receipt of the first completion request, write the first container index from the memory to the persistent storage. The machine-readable medium 900 may include instructions that upon execution cause the processor to, prior to receiving the first completion request from the second stream process receive, from the second stream process, a second write request for the first container index in memory, and, in response to a receipt of the second write request, send a second token to the second stream process without writing the first container index to the persistent storage.

10. Example Computing Device

Figure 10:
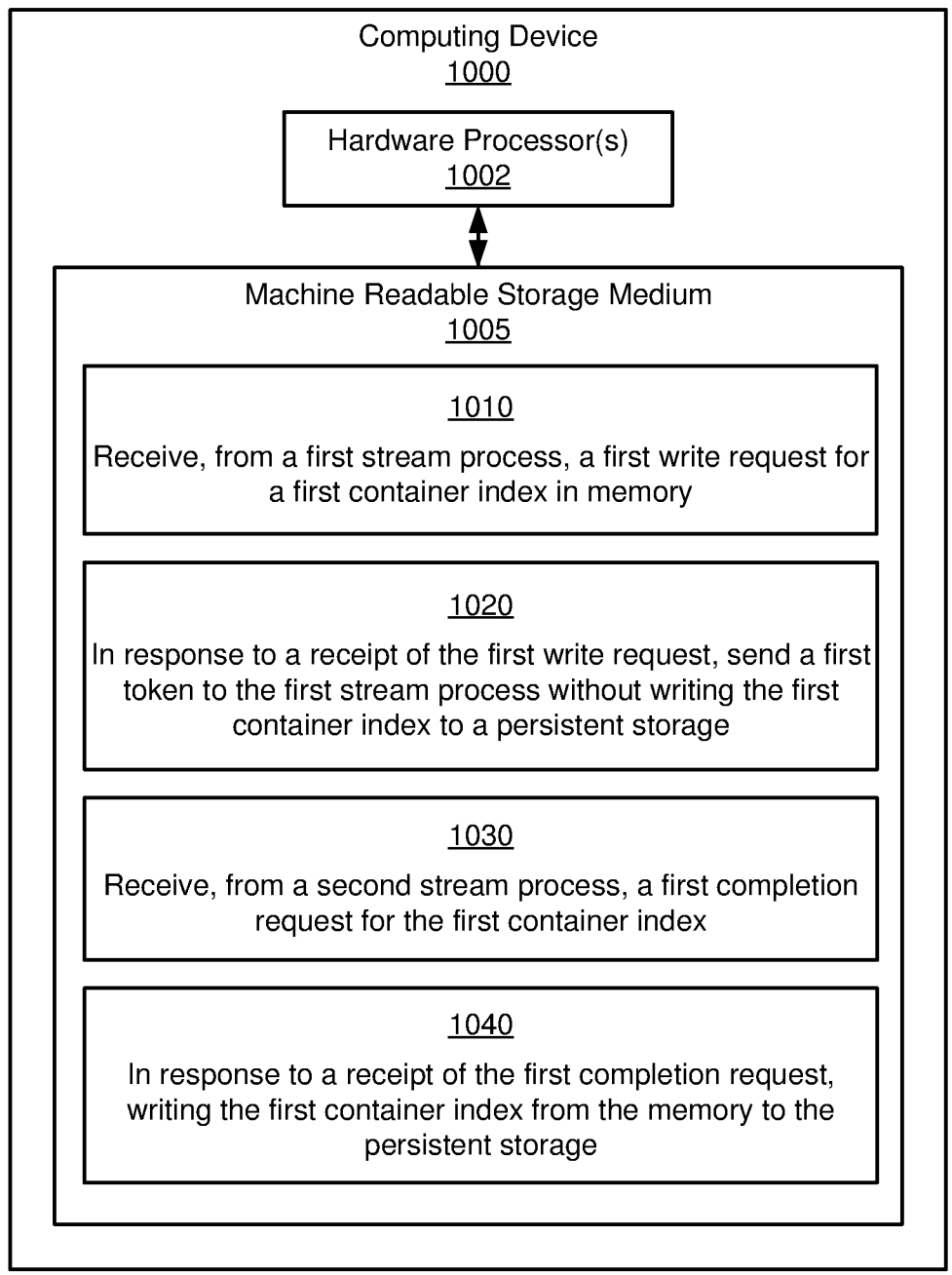
FIG. 10 is a schematic diagram of an example computing device, in accordance with some implementations.

FIG. 10 shows a schematic diagram of an example computing device 1000. In some examples, the computing device 1000 may correspond generally to some or all of the storage system 100 (shown in FIG. 1). As shown, the computing device 1000 may include hardware processor 1002 and machine-readable storage 1005 including instruction 1010-1040. The machine-readable storage 1005 may be a non-transitory medium. The instructions 1010-1040 may be executed by the hardware processor 1002, or by a processing engine included in hardware processor 1002.

Instruction 1010 may be executed to receive, from a first stream process, a first write request for a first container index in memory. Instruction 1020 may be executed to, in response to a receipt of the first write request, send a first token to the first stream process without writing the first container index to a persistent storage. Instruction 1030 may be executed to receive, from a second stream process, a first completion request for the first container index. Instruction 1040 may be executed to, in response to a receipt of the first completion request, write the first container index from the memory to the persistent storage. The computing device 1000 may include instructions executable by the processor 1002 to, prior to receiving the first completion request from the second stream process receive, from the second stream process, a second write request for the first container index in memory, and in response to a receipt of the second write request, send a second token to the second stream process without writing the first container index to the persistent storage.

In accordance with implementations described herein, a storage system may include a control process to manage persistence operations. The control process may receive a request for a persistence operation from a stream process, and in response may provide a token to the stream process instead of performing the requested persistence operation. In some implementations, the provided token may represent a contract to perform the requested write at a later point in time. Further, the stream process can subsequently use the token to complete the persistence operation. Using such tokens, the storage system may persist of a data object while reducing the number of duplicated writes of the data object. Accordingly, some implementations may improve the performance of the storage system, and may reduce the amount of computing resources that are consumed to provide data persistence.

Note that, while FIGS. 1-10 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
receiving, from a first stream process, a first write request for a first container index in memory;
in response to a receipt of the first write request, sending a first token to the first stream process without writing the first container index to a persistent storage;
receiving, from a second stream process, a first completion request for the first container index; and
in response to a receipt of the first completion request, writing the first container index from the memory to the persistent storage.

2. The method of claim 1, comprising, prior to receiving the first completion request from the second stream process:
receiving, from the second stream process, a second write request for the first container index in memory;
in response to a receipt of the second write request, sending a second token to the second stream process without writing the first container index to the persistent storage.

3. The method of claim 2, comprising:
after writing the first container index to the persistent storage, sending a first write confirmation to the second stream process, wherein the first write confirmation is associated with the second token.

4. The method of claim 3, comprising, after sending the first write confirmation to the second stream process:
receiving, from the first stream process, a second completion request for the first container index;
in response to a receipt of the second completion request, determining that the first container index was previously written to the persistent storage; and
in response to determining that the first container index was previously written to the persistent storage, sending a second write confirmation to the first stream process, wherein the second write confirmation is associated with the first token.

5. The method of claim 4, wherein the first completion request includes the second token sent to the second stream process, and wherein the second completion request includes the first token sent to the first stream process.

6. The method of claim 2, comprising:
receiving, from the first stream process, a third write request for a second container index in memory;
in response to a receipt of the third write request, sending a third token to the first stream process, wherein the third token is associated with a first contract to persist the second container index.

7. The method of claim 6, comprising:
detecting a memory condition associated with the second container index; and
in response to a detection of the memory condition, modifying the first contract to persist a journal instead of the second container index.

8. The method of claim 7, wherein modifying the first contract comprises updating a first entry of a contract data structure, wherein the first entry is associated with the third token.

9. The method of claim 6, comprising:
detecting a pending eviction of the second container index from memory; and
in response to a detection of the pending eviction, writing the second container index from the memory to the persistent storage.

10. A non-transitory machine-readable medium storing instructions that upon execution cause a processor to:
receive, from a first stream process, a first write request for a first container index in memory;

in response to a receipt of the first write request, send a first token to the first stream process without writing the first container index to a persistent storage;

receive, from a second stream process, a first completion request for the first container index; and in response to a receipt of the first completion request, write the first container index from the memory to the persistent storage.

11. The non-transitory machine-readable medium of claim 10, including instructions that upon execution cause the processor to, prior to receiving the first completion request from the second stream process:

receive, from the second stream process, a second write request for the first container index in memory;

in response to a receipt of the second write request, send a second token to the second stream process without writing the first container index to the persistent storage.

12. The non-transitory machine-readable medium of claim 11, including instructions that upon execution cause the processor to:

after writing the first container index to the persistent storage, send a first write confirmation to the second stream process, wherein the first write confirmation is associated with the second token.

13. The non-transitory machine-readable medium of claim 12, including instructions that upon execution cause the processor to, after sending the first write confirmation to the second stream process:

receive, from the first stream process, a second completion request for the first container index;

in response to a receipt of the second completion request, determine whether the first container index was previously written to the persistent storage; and in response to a determination that the first container index was previously written to the persistent storage, send a second write confirmation to the first stream process, wherein the second write confirmation is associated with the first token.

14. The non-transitory machine-readable medium of claim 13, wherein the first completion request includes the second token sent to the second stream process, and wherein the second completion request includes the first token sent to the first stream process.

15. The non-transitory machine-readable medium of claim 11, including instructions that upon execution cause the processor to:

receive, from the first stream process, a third write request for a second container index in memory;

in response to a receipt of the third write request, send a third token to the first stream process, wherein the third token is associated with a first contract to persist the second container index.

16. A storage system comprising:

a processor comprising a plurality of processing engines; and a machine-readable storage storing instructions, the instructions executable by the processor to:

receive, from a first stream process, a first write request for a first container index in memory;

in response to a receipt of the first write request, send a first token to the first stream process without writing the first container index to a persistent storage;

receive, from a second stream process, a first completion request for the first container index; and in response to a receipt of the first completion request, write the first container index from the memory to the persistent storage.

17. The storage system of claim 16, including instructions executable by the processor to, prior to receiving the first completion request from the second stream process:

receive, from the second stream process, a second write request for the first container index in memory;

in response to a receipt of the second write request, send a second token to the second stream process without writing the first container index to the persistent storage.

18. The storage system of claim 17, including instructions executable by the processor to:

after writing the first container index to the persistent storage, send a first write confirmation to the second stream process, wherein the first write confirmation is associated with the second token.

19. The storage system of claim 18, including instructions executable by the processor to, after sending the first write confirmation to the second stream process:

receive, from the first stream process, a second completion request for the first container index;

in response to a receipt of the second completion request, determine whether the first container index was previously written to the persistent storage; and in response to a determination that the first container index was previously written to the persistent storage, send a second write confirmation to the first stream process, wherein the second write confirmation is associated with the first token.

20. The storage system of claim 19, wherein the first completion request includes the second token sent to the second stream process, and wherein the second completion request includes the first token sent to the first stream process.

* * * * *